United States Patent
Oh et al.

(10) Patent No.: US 6,296,830 B1
(45) Date of Patent: Oct. 2, 2001

(54) LAYERED STRUCTURE MANGANESE DIOXIDE FOR CATHODE MATERIAL IN LITHIUM RECHARGEABLE CELL AND PROCESS FOR PRODUCING THE SAME

(75) Inventors: Seung-Mo Oh, Ahanyang; Sa-Heum Kim, 138-1202, Hansung Mokhwa Apt., 880 Keumjung-Dong, Kunpo-City, Kyung ki-Do; Wan Mook Im, Koyang, all of (KR)

(73) Assignees: Fincell Co., Ltd., Sungnam; Sa-Heum Kim, Kunpo, both of (KR)

( * ) Notice: Subject to any disclaimer, the term of this patent is extended or adjusted under 35 U.S.C. 154(b) by 0 days.

(21) Appl. No.: 09/236,325

(22) Filed: Jan. 25, 1999

(30) Foreign Application Priority Data

Feb. 26, 1998 (KR) .................................... 98-6054

(51) Int. Cl.$^7$ .......................... C01G 45/12; C01D 15/00; H01M 4/50; H01M 4/58
(52) U.S. Cl. ...................... 423/599; 423/179.5; 429/224; 429/231.9; 429/231.95
(58) Field of Search ............................... 423/599, 179.5; 429/224, 231.9, 231.95

(56) References Cited

U.S. PATENT DOCUMENTS

| | | | |
|---|---|---|---|
| 4,520,005 | 5/1985 | Yao | 423/599 |
| 5,506,077 | * 4/1996 | Koksbang | 429/224 |

(List continued on next page.)

OTHER PUBLICATIONS

*Lithium Batteries, New Materials, Developments and Perspectives*, G. Pistoia Ed., Elsevier (1994). "Interclation in Layered and Three–dimensional Oxides", p. 461.

*Elementary Solid State Physics*, M.A. Omar Ed., Addison–Wesley Publishing (1975), "The Fourteen Bravais Lattices and the Seven Crystal Systems", p. 9.

*Elements of X–Ray Diffraction*, $2^{nd}$ Edition, B.D. Cullity Ed., (1977) "Determination of Crystal Structure", pp. 402, 405, 427.

*Modern Inorganic Chemistry*, W.L. Jolly Ed., McGraw Hill (1985) "Classification of Bonds and Crystals", p. 267; pp. 550–555.

*Lithium Ion Battery Technology*, R.J. Brodd Ed., ITE–JEC Press, (1995), "Manganese Oxides for Lithium Batteries", p. 38.

Journal of the Electrochemical Society; 147 (2) 413–419 (2000), "Factors Controlling the Stability of O3– and P2–Type Layered $MnO_2$ Structures and Spinel Transition Tendency in Li Secondary Batteries".

(List continued on next page.)

Primary Examiner—Steven P. Griffin
Assistant Examiner—Cam N. Nguyen
(74) Attorney, Agent, or Firm—Staas & Halsey LLP

(57) ABSTRACT

A layered structure manganese dioxide ($MnO_2$) of which oxide lattices are in the pattern of pseudo-hexagonal close packing ( ... AABB ... ) and has hexagonal $P6_3$/mmc space group or orthorhombic Cmcm space group. The present invention also provides a process for producing said layered structure manganese dioxide ($MnO_2$) which comprises heat treating a mixture of an alkali metal compound and a manganese compound at a high temperature. During the process, bismuth compounds or lead compounds may be added in order to stabilize the layered crystal structure of $MnO_2$, or lithium compounds may be added in order to improve the reversibility of charge and discharge. The layered structure $MnO_2$ is suitable for use as a cathode material in lithium rechargeable cells, since it does not transform into a spinel phase during charge and discharge cycling, thus having an excellent charging and discharging reversibility.

13 Claims, 7 Drawing Sheets

U.S. PATENT DOCUMENTS

| | | | | |
|---|---|---|---|---|
| 5,558,961 | * | 9/1996 | Doeff et al. | 429/224 |
| 5,700,442 | * | 12/1997 | Bloch et al. | 423/599 |
| 5,733,681 | * | 3/1998 | Li et al. | 429/194 |
| 5,824,285 | * | 10/1998 | Koksbang | 423/599 |
| 5,882,821 | * | 3/1999 | Miyasaka | 429/224 |
| 5,981,106 | * | 11/1999 | Amine et al. | 429/224 |

OTHER PUBLICATIONS

J. Electrochem. Soc., vol. 143, No. 8, Aug. 1996, Lithium Insertion Processes of Orthorhombic $Na_8MnO_2$–Based Electrode Materials.
J. Electrochem Soc., vol. 144, No. 4, Apr. 1997.
American Mineralogist, vol. 75, pp. 477–489, 1990.
American Mineralogist, vol. 73, pp. 1401–1404, 1988.
Z. Anorg. Allg. Chem. 531 (1985) pp. 177–182.
Letter to Nature, A. Robert Armstrong & Peter G. Bruce, vol. 381, Jun. 6, 1996.
Chem. Mater, 1996, 8, pp. 1275–1280.
J. Mater. Chem., 1995, 5(11), pp. 1919–1925.
J. Amer. Chem. Soc., 72, p. 1781, 1950.
Electrochemica Acta vol. 26, pp. 435–443, 1981.
Journal of Solid State Chemistry 88, 325–333 (1990).
Mineralogical Magazine, Mar. 1974, vol. 39, pp. 559–563.
Electrochimica, vol. 40, No. 6, pp. 785–789, 1995.
Journal of Power Sources 54 (1995) pp. 319–322.
J. Electrochem. Soc., vol. 144, No. 4, Apr. 1997, The Electochemical Society, Inc.
J. Electrochem. Soc., vol. 144, No. 8, Aug., 1997.
J. Amer. Chem. Soc. 72, p. 856–866, 1950.
Mat. Res. Bull., vol. 19, pp. 1229–1235, 1984.
J. Chem. Soc. (A), 1821–1826, 1971.
Mat. Res. Bull., vol. 28, pp. 93–100, 1993.
Chem. Mater. 1995, 7, pp. 1604–1606.

* cited by examiner

LAYERED STRUCTURE MANGANESE DIOXIDE FOR CATHODE MATERIAL IN LITHIUM RECHARGEABLE CELL AND PROCESS FOR PRODUCING THE SAME

BACKGROUND OF THE INVENTION

1. Field of the Invention

The present invention relates to a novel layered structure manganese dioxide ($MnO_2$) which does not transform into a spinel phase during repeated charge and discharge cycling, and to a process for producing the same by heat treating a mixture of an alkali metal compound and a manganese compound.

2. Description of the Related Art $MnO_2$ materials have been widely used as a cathode material for primary cells such as LeClanche cells and alkaline cells, or rechargeable cells such as lithium cells, since they are inexpensive and are not associated with any critical environmental problems. Much research concerning such $MnO_2$ materials has been actively conducted. $MnO_2$ materials have several different crystal structures. Among them, layered structure $MnO_2$ materials are considered to be advantageous as cell materials since they provide a relatively favorable pathway for ionic diffusion. However, such layered structure $MnO_2$ materials are conventionally prepared using complicated processes. Furthermore, when such layered structure $MnO_2$ materials are used in lithium rechargeable cells, the $MnO_2$ may transform into a spinel phase, or the layered crystal structure may be destroyed during repeated charge and discharge cycling, thereby decreasing cyclability. Phase transformation of $MnO_2$ from a layered structure to a spinel phase may lead to a change in cell voltage and thereby cause a decrease in the cell capacity. For these reasons, the commercial use of such layered structure $MnO_2$ materials has not been very productive. As such, the development of layered structure $MnO_2$ materials, which have structural stability and thus do not transform into a spinel phase during charge and discharge cycling, and the process for producing the same is very important.

The former structural refinements of layered structure $MnO_2$ materials (the crystal system and the space group) are as follows. Post et al. disclosed that layered structure $MnO_2$ materials have a monoclinic C2/m space group (Amer. Mineral., Vol. 75, p. 477, 1990). Post et al. also reported that the crystal structure of chalcophanite ($ZnMn_3O_7$), which is the most widely known layered structure of $MnO_2$ has a hexagonal $R\bar{3}$ space group (Amer. Mineral., Vol. 73, p. 1401, 1988). This report put an end to the dispute concerning the crystal structure of $MnO_2$. Chalcophanite has been used as a model compound for analyzing the crystal structure of most layered structure $MnO_2$ materials and was thought to have a triclinic $P\bar{1}$ space group. Chang et al. synthesized a single crystal of $Na_2Mn_3O_7$ having a structure similar to chalcophanite and reported that it had a triclinic $P\bar{1}$ space group (Z. Anorg. Allg. Chem., Vol. 531, p. 177, 1985). Armstrong et al. reported that $LiMnO_2$ produced from an ion exchange of $NaMnO_2$ had a C2/m space group, which is the same as Post's report (Nature, Vol. 381, p. 499, 1996). Chen et al. suggested that the crystal structure of $A_xMnO_2.nH_2O$ obtained from Li, Na and K permanganates by a hydrothermal method had a hexagonal $R\bar{3}m$ space group (Chem. Mater., Vol. 8, p. 1275, 1996). Croguennec et al. analyzed the crystal structure of layered structure $LiMnO_2$ and reported that it had an orthohombic Pmmn space group (J. Mater. Chem., Vol. 5, p. 1919, 1995).

As such, layered structure $MnO_2$ materials have been known as having various crystal systems and space groups. The differences in the crystal systems and the space groups arise from differences in synthesizing conditions, precursor, interlayer cations, etc.

In connection with the production of $MnO_2$ for use as a cathode material in cells, layered structure $MnO_2$ materials have been prepared via oxidation of Mn (II) or reduction of Mn (VII).

Wadsley et al. produced layered structure $MnO_2$ materials by oxidizing manganese (II) nitrate in a strong alkaline sodium hydroxide aqueous solution with oxygen or air (J. Amer. Chem. Soc., Vol. 72, p. 1781, 1950). Parida et al. prepared a layered structure $MnO_2$ by oxidizing manganese (II) sulfate in a weak acidic sulfuric acid aqueous solution with potassium permanganate (VII) (Electrochim. Acta, Vol. 26, p. 435, 1981). Bach et al. produced a layered structure $MnO_2$ by a sol-gel method wherein potassium permanganate (VII) or sodium permanganate (VII) is reduced with fumaric acid (J. Solid St. Chem., Vol. 88, p. 325, 1990). Cole et al. prepared layered structure $MnO_2$ materials by dripping concentrated hydrochloric acid into a potassium permanganate (VII) aqueous solution. Endo et al. produced a layered structure $MnO_2$ by using a hydrothermal method from a potassium permanganate (VII) aqueous solution (Miner. Mag., Vol. 39, p. 559, 1974).

However, the above production processes have problems in that i) they require multistep reactions and thus the processes are complicated, ii) much care must be taken in controlling the temperature, concentration and pH of the reaction system, and iii) low temperature synthesis leads to a decrease in the crystallinity of $MnO_2$ or diminishes the purity of $MnO_2$.

In order to stabilize the layered crystal structure of $MnO_2$ to be produced, various attempts including adding bismuth (Bi) or lead (Pb) have been conducted. Yao et al. produced layered structure $MnO_2$ materials in accordance with Wadsley's method by adding manganese (II) nitrate together with bismuth (III) nitrate into a strong alkaline sodium hydroxide aqueous solution and then oxidizing the resulted suspension with oxygen or air (U.S. Pat. No. 4,520,005, 1985). Bach et al. prepared layered structure $MnO_2$ materials in accordance with Cole's method by adding bismuth (III) nitrate into a potassium permanganate (VII) aqueous solution and then dripping concentrated nitric acid (Electrochim. Acta, Vol. 40, p. 785, 1995).

However, there are many problems in that the above-mentioned processes require complex multi-step reactions, and the obtained $MnO_2$ materials have a large amount of side reaction products, and thus show a decreased crystallinity. Therefore, for the commercial use of layered structure $MnO_2$ materials as a cathode material in rechargeable cells, there is a strong need for the development of a method for stabilizing crystal structures and preparing layered structure $MnO_2$ materials in a simpler manner.

Many researchers have reported on lithium rechargeable cells wherein layered structure $MnO_2$ materials have been used as cathode materials. On the other hand, most reports have pointed out that there is a problem of the transformation of $MnO_2$ into a spinel phase.

Le Cras et al. disclosed that layered structure $MnO_2$ materials obtained by low temperature synthesis from a sodium pennanganate solution completely transformed to a spinel phase after charge and discharge cycling (J. Power Sources, Vol. 54, p. 319, 1995). Chen et al. reported the same result as Le Cras's report (J. Electrochem. Soc., Vol. 144, p. 64, 1997). According to them, layered structure $MnO_2$ materials obtained by decomposition of lithium permanganate (VII) at a low temperature have an oxide arrangement the same as that of a spinel phase. Such a similarity in the oxide arrangement allows the replacement of lithium with manganese, which in turn directly leads to structural instability causing the transformation of $MnO_2$ into a spinel phase. Vitins et al. obtained a layered structure $LiMnO_2$ by ion exchange of alpha-$NaMnO_2$, and found a new spinel phase which is distinguished by X-ray diffraction analysis during charge and discharge cycling (J. Electrochem. Soc., Vol. 144, p. 2587, 1997).

In summary, most layered structure $MnO_2$ materials reported up to now have the oxide arrangement similar to a cubic close packing ( . . . ABCABC . . . ) pattern, and thus may easily transform into a spinel phase having a similar oxide arrangement in the pattern of cubic close packing. For this reason, a layered structure $MnO_2$, which does not transform into a spinel phase during repeated charge and discharge cycling when used as a cathode material in lithium rechargeable cells, and a process for producing the same are urgently needed in the lithium rechargeable cell-related industrial fields.

SUMMARY OF THE INVENTION

Accordingly, it is an object of the present invention to develop a novel layered structure $MnO_2$ which does not transform into a spinel phase when used as a cathode material in lithium rechargeable cells, and has an oxide arrangement which is not cubic close packing, and to a process for producing the same. Specifically, the purpose of the present invention resides in providing the layered structure $MnO_2$ having an oxide arrangement in a pattern of pseudo-hexagonal close packing ( . . . AABB . . . ) and the layered structure $MnO_2$ has a hexagonal $P6_3/mmc$ space group or an orthorhombic Cmcm space group.

It is another object of the invention to provide a process for producing a layered structure $MnO_2$, which includes heat treating a mixture of an alkali metal compound and a manganese compound at 500 to 1500° C. and then washing and drying the resulting mixture to provide the layered structure $MnO_2$.

It is still another object of the invention to provide a lithium rechargeable cell fabricated by using the layered structure $MnO_2$ produced in accordance with the present invention as a cathode material.

The above and other objects and features of the present invention will become apparent to those skilled in the art of the following detailed description. It should be understood, however, that the detailed description and specific examples, while indicating preferred embodiments of the present invention are given by way of illustration and not limitation. Many changes and modifications within the scope of the present invention may be made without departing from the spirit thereof, and the invention includes all such modifications.

BRIEF DESCRIPTION OF THE DRAWINGS

These and other objects and advantages of the invention will become apparent and more readily appreciated from the following description of the preferred embodiments, taken in conjunction with the accompanying drawings of which.

DESCRIPTION OF THE PREFERRED EMBODIMENTS

Figure 1:
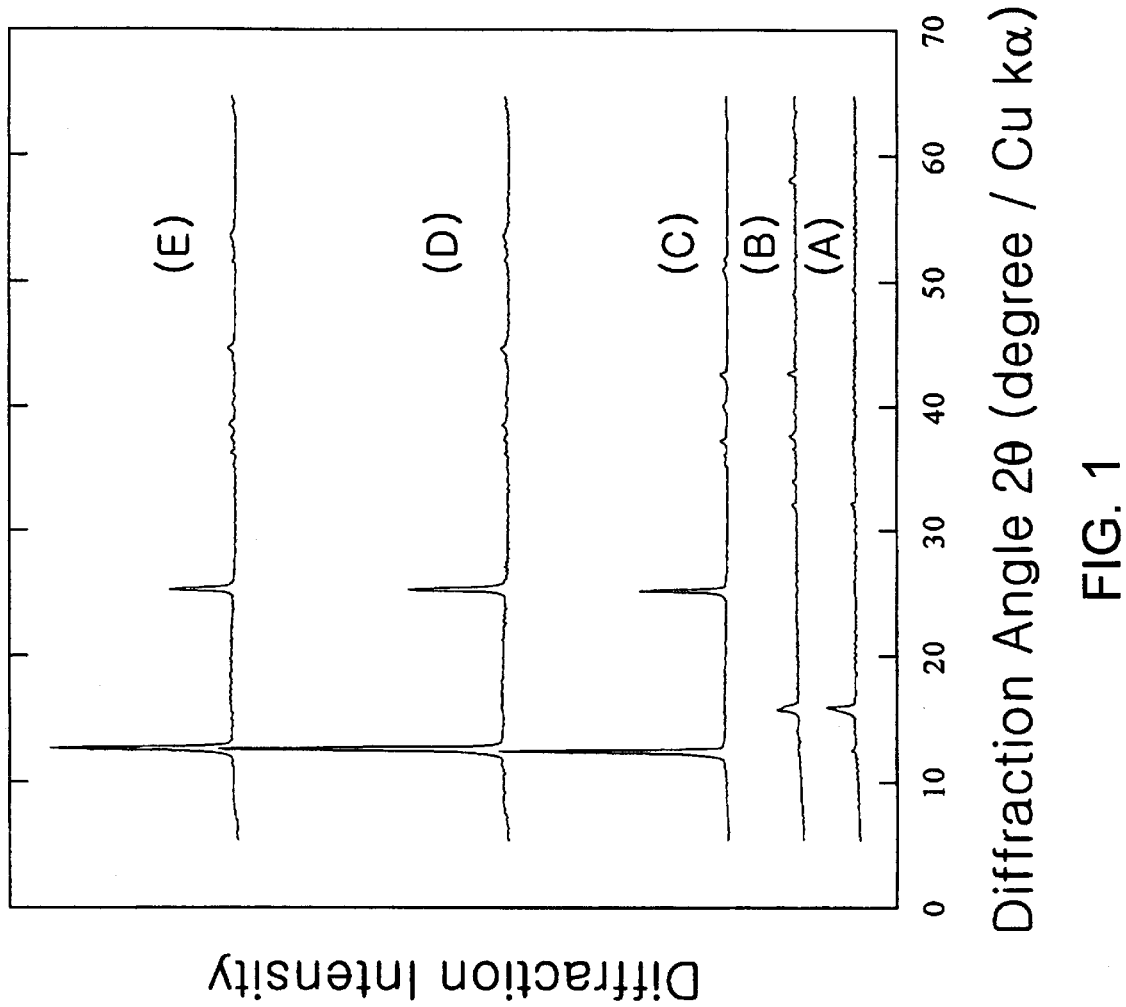
FIGS. 1, 3 and 4 show X-ray diffraction patterns of layered structure $MnO_2$ materials produced according to the embodiments of the present invention.

Reference will now made in detail to the present preferred embodiments of the present invention, examples of which are illustrated in the accompanying drawings.

The present invention relates to a novel layered structure manganese dioxide ($MnO_2$) which does not transform into a spinel phase during repeated charge and discharge cycling, and to a process for producing the same by heat treatment of a mixture of an alkali metal compound and a manganese compound.

The layered structure $MnO_2$ of the present invention is characterized by an oxide arrangement in a pattern of pseudo-hexagonal close packing ( . . . AABB . . . ) and the layered structure $MnO_2$ has the hexagonal $P6_3/mmc$ space group or the orthorhombic Cmcm space group. Such a layered structure $MnO_2$ has not been reported yet. Unlike formerly known $MnO_2$ materials, the layered structure $MnO_2$ according to the present invention has the benefit of not transforming into a spinel phase when used as a cathode material in lithium rechargeable cells.

In order to produce such a layered structure $MnO_2$, the present invention includes heat treatment (or pyrolysis) of a mixture of an alkali metal compound and a manganese compound.

The alkali metal compound comprises alkali metal (I) compounds which fall under Group I of the periodic table and alkaline earth metal compounds (II) which fall under Group II of the periodic table. Among them, alkali metal compounds (I) are more preferred. Examples of suitable alkali metal compounds according to the embodiments of the present invention include nitrates, carbonates, hydroxides, oxides, acetates and oxalates of Na, K, Rb and Cs. In particular, nitrates, carbonates and hydroxides are more preferred.

As the manganese compound, oxides, nitrates, carbonates, acetates and oxalates of manganese may be used. Oxides (MnO, $Mn_3O_4$, $Mn_2O_3$, etc), nitrates and carbonates of manganese are preferred.

The mixture is prepared by mixing a manganese compound with an alkali metal compound so that the molar ratio of alkaki metal: Mn is in the range of from 0.25:1 to 0.75:1, and preferably in the range of from 0.3:1 to 0.6:1. When the molar ratio deviates from the above range, the $MnO_2$ does not have a layered structure but has a tunnel structure or other complex structure. Therefore, it is difficult to attain for the purpose of the present invention.

To this mixture, a bismuth compound, lead compound, lithium compound or a mixture thereof may be added. When bismuth compounds or lead compounds are added, the layered crystal structure of $MnO_2$ produced can be stabilized. When a lithium compound is added and the resulting layered structure $MnO_2$ is used as a cathode material in lithium rechargeable cells, the reversibility of such cells can be improved. The possible bismuth compounds, lead compounds and lithium compounds include oxides, nitrates, hydroxides, carbonates, acetates and oxalates. In particular, oxides, nitrates and carbonates are preferred. As a lithium compound, $LiOH$, $LiNO_3$ or $Li_2CO_3$ can be used. As the bismuth compound, $Bi_2O_3$ or $Bi(NO_3)_3$ can be used. As the lead compound, $PbO$ or $Pb(NO_3)_2$ can be used.

The amount of the above mentioned additional metal compound is present in an amount such that the molar ratio of metal element:Mn is not more than 0.5:1. Preferably the molar ratio of Li:Mn is not more than 0.5:1 for a lithium compound, and the molar ratio of Bi or Pb:Mn, respectively, is not more than 0.1:1. As the amount of the additional metal compound increases, the content of manganese in the resulting obtained $MnO_2$ diminishes, thereby causing a decrease in the theoretical capacity as a cathode material in rechargeable cells. Therefore, it is necessary to control the adding amount of the compound and/or element within the suitable aforementioned range.

The process for producing the layered structure $MnO_2$ according to the embodiments of the present invention includes three steps, i) preparing the mixture, ii) heat treatment (pyrolysis) and iii) washing and drying; or four steps if one includes post treatment in addition to the three steps mentioned above.

First of all, in the step of the mixture preparation, the alkali metal compound and the manganese compound are mixed and pulverized into a fine powder by means such as a ball mill. The size of powder should be not more than 100 mesh, preferably not more than 400 mesh. At this step, it is possible to add oxides, nitrates or hydroxides of bismuth, lead or lithium into the powder.

Thus, the obtained mixture is subjected to pyrolysis in a range of 500 to 1500° C., preferably 700 to 1100° C. to be decomposed into a manganese dioxide and side reaction products. It is possible to obtain the layered structure $MnO_2$ with pyrolysis within one hour; however, it is preferred that the pyrolysis is conducted over a period of more than two hours in order to obtain a clean crystal structure. The temperature for the above pyrolysis may be determined on the basis of the crystallinity and the surface area of $MnO_2$ and the oxidation number of manganese. The time required for the pyrolysis step may be further shortened.

After pyrolysis, water-soluble products formed by side reaction are washed and removed. The remaining $MnO_2$ is dried in a reduced pressure drier. The washing may be carried out by using deionized distilled water and, if necessary, by means of an ultrasonic cleaner to remove impurities therein.

The present invention is described in greater detail by referring to examples without limiting the same in any way. In particular, the examples demonstrate the preparation of a layered structure $MnO_2$ in accordance with the process provided by the present invention and charge and discharge cycling experiment by using the prepared layered structure $MnO_2$.

Preparation of Layered Structure Manganese Dioxide

EXAMPLE 1

1.9 g of sodium carbonate ($Na_2CO_3$) and 5 g of manganese oxide (MnO) were subjected to heat treatment for 5 hours at 800° C. and then the resulting mixture was completely washed with deionized distilled water. The filtered powder was dried in a reduced pressure drier to give about 7.1 g of a layered structure $MnO_2$. The X-ray diffraction pattern of the layered structure $MnO_2$ obtained is shown as (A) in FIG. 1.

EXAMPLE 2

1.9 g of sodium carbonate ($Na_2CO_3$) and 5 g of manganese oxide (MnO) were subjected to heat treatment for 5 hours at 1000° C. and then the resulting mixture was completely washed with deionized distilled water. The filtered powder was dried in a reduced pressure drier to give about 7.0 g of a layered structure $MnO_2$. The X-ray diffraction pattern of the layered structure $MnO_2$ obtained is shown as (B) in FIG. 1.

EXAMPLE 3

2.3 g of potassium carbonate ($K_2CO_3$) and 5 g of manganese oxide ($Mn_3O_4$) were subjected to heat treatment for 5 hours at 800° C. and then the resulting mixture was completely washed with deionized distilled water. The filtered powder was dried in a reduced pressure drier to give about 7.0 g of a layered structure $MnO_2$. The X-ray diffraction pattern of the layered structure $MnO_2$ obtained is shown as (C) in FIG. 1.

EXAMPLE 4

2.3 g of potassium carbonate ($K_2CO_3$) and 5 g of manganese oxide ($Mn_3O_4$) were subjected to heat treatment for 5 hours at 1000° C. and then the resulting mixture was completely washed with deionized distilled water. The filtered powder was dried in a reduced pressure drier to give about 6.9 g of a layered structure $MnO_2$. The X-ray diffraction pattern of the layered structure $MnO_2$ obtained is shown as (D) in FIG. 1. In order to analyze the crystal structure with greater accuracy, a Rietveld refinement was conducted. The result thereof is shown in FIG. 2A. The result regarding the information on a crystal structure (the position and the arrangement of element, etc.) obtained from the refinement is shown in FIG. 2B.

EXAMPLE 5

The layered structure $MnO_2$ in a powder form which was obtained from Example 4 was completely washed with an ultrasonic cleaner to remove impurities and then dried in a reduced pressure drier to give a layered structure $MnO_2$. The X-ray diffraction pattern of the layered structure $MnO_2$ obtained is shown as (E) in FIG. 1.

EXAMPLE 6

2.8 g of rubidium nitrate ($RbNO_3$) and 5 g of manganese oxide ($Mn_2O_3$) were subjected to heat treatment for 5 hours at 1000° C. and then the resulting mixture was completely washed with deionized distilled water. The filtered powder was dried in a reduced pressure drier to give about 7.3 g of a layered structure $MnO_2$. The X-ray diffraction pattern of the layered structure $MnO_2$ obtained is shown as (F) in FIG. 3.

EXAMPLE 7

4.7 g of rubidium nitrate ($RbNO_3$) and 5 g of manganese oxide ($Mn_2O_3$) were subjected to heat treatment for 5 hours at 1000° C. and then the resulting mixture was completely washed with deionized distilled water. The filtered powder was dried in a reduced pressure drier to give about 8.1 g of a layered structure $MnO_2$. The X-ray diffraction pattern of the layered structure $MnO_2$ obtained is shown as (G) in FIG. 3.

EXAMPLE 8

3.4 g of cesium nitrate ($CsNO_3$) and 5 g of manganese carbonate ($MnCO_3$) were subjected to heat treatment for 5 hours at 1000° C. and then the resulting mixture was completely washed with deionized distilled water. The filtered powder was dried in a reduced pressure drier to give about 5.3 g of a layered structure $MnO_2$. The X-ray diffraction pattern of the layered structure $MnO_2$ obtained is shown as (H) in FIG. 3.

EXAMPLE 9

4.2 g of cesium nitrate ($CsNO_3$) and 5 g of manganese carbonate ($MnCO_3$) were subjected to heat treatment for 5 hours at 1000° C. and then the resulting mixture was completely washed with deionized distilled water. The filtered powder was dried in a reduced pressure drier to give about 6.1 g of a layered structure $MnO_2$. The X-ray diffraction pattern of the layered structure $MnO_2$ obtained is shown as (I) in FIG. 3.

EXAMPLE 10

0.16 g of lithium hydroxide (LiOH) was added into the mixture of Example 4 and then the resulting mixture was subjected to heat treatment for 5 hours at 1000° C. After passing through the same procedures as in Example 4, about 7.3 g of a layered structure $MnO_2$ was obtained. The X-ray diffraction pattern of the layered structure $MnO_2$ obtained is shown as (J) in FIG. 4.

EXAMPLE 11

1.6 g of bismuth nitrate ($Bi(NO_3)_3 5H_2O$) was added into the mixture of Example 4 and then the resulting mixture was subjected to heat treatment for 5 hours at 1000° C. After passing through the same procedures as in Example 4, about 8.0 g of a layered structure $MnO_2$ was obtained. The X-ray diffraction pattern of the layered structure $MnO_2$ obtained is shown as (K) in FIG. 4.

EXAMPLE 12

1.1 g of lead nitrate ($Pb(NO_3)_2$) was added into the mixture of Example 4 and then the resulting mixture was subjected to heat treatment for 5 hours at 1000° C. After passing through the same procedures as in Example 4, about 7.9 g of a layered structure $MnO_2$ was obtained. The X-ray diffraction pattern of the layered structure $MnO_2$ obtained is shown as (L) in FIG. 4.

CHARGE AND DISCHARGE CYCLING EXPERIMENTATION WHEN LAYERED STRUCTURE $MnO_O$ OBTAINED IN THE ABOVE EXAMPLES WAS USED AS A CATHODE MATERIAL IN CELLS

EXAMPLE 13

A cell was fabricated by using $MnO_2$ prepared in Example 4 as a cathode material. The charge and discharge cycling experiment was carried out at a constant current of 0.4 C within a voltage range of from 4.3 to 2.0 V (vs. Li/Li$^+$; meaning that a reference potential was set as an equilibrium potential between Li and Li$^+$). As an anode, a lithium metal was used. As an electrolyte, a solution was prepared by dissolving lithium perchlorate ($LiClO_4$) to a concentration of 1M in a mixed solvent of propylene carbonate and 1,2-dimethoxyethane in a volume ratio of 1:1. The change of discharge capacity in this cell is shown as (M) in FIG. 5.

EXAMPLE 14

A cell was fabricated by using $MnO_2$ prepared in Example 10 as a cathode material.

The charge and discharge cycling experiment was carried out in a similar manner to Example 13. The change of discharge capacity in this cell is shown as (N) in FIG. 5. The X-ray diffraction patterns of the electrodes before and after the charge and discharge cycling experiment are shown as (Na) and (Nb), respectively, in FIG. 6 in a comparative manner.

Figure 2A:
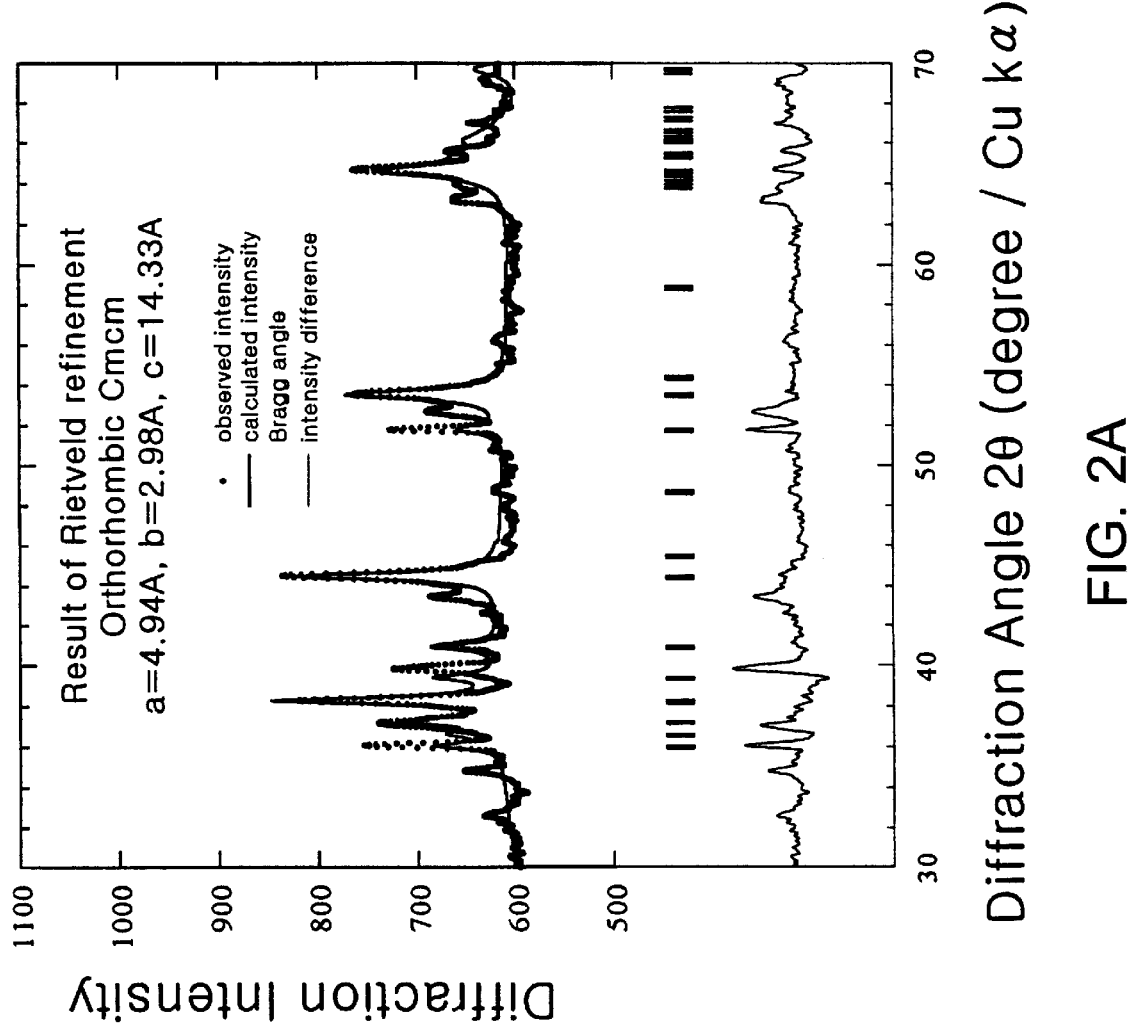
FIG. 2A shows the refinement result of layered structure $MnO_2$ materials produced according to the embodiments of the present invention.
Figure 2B:
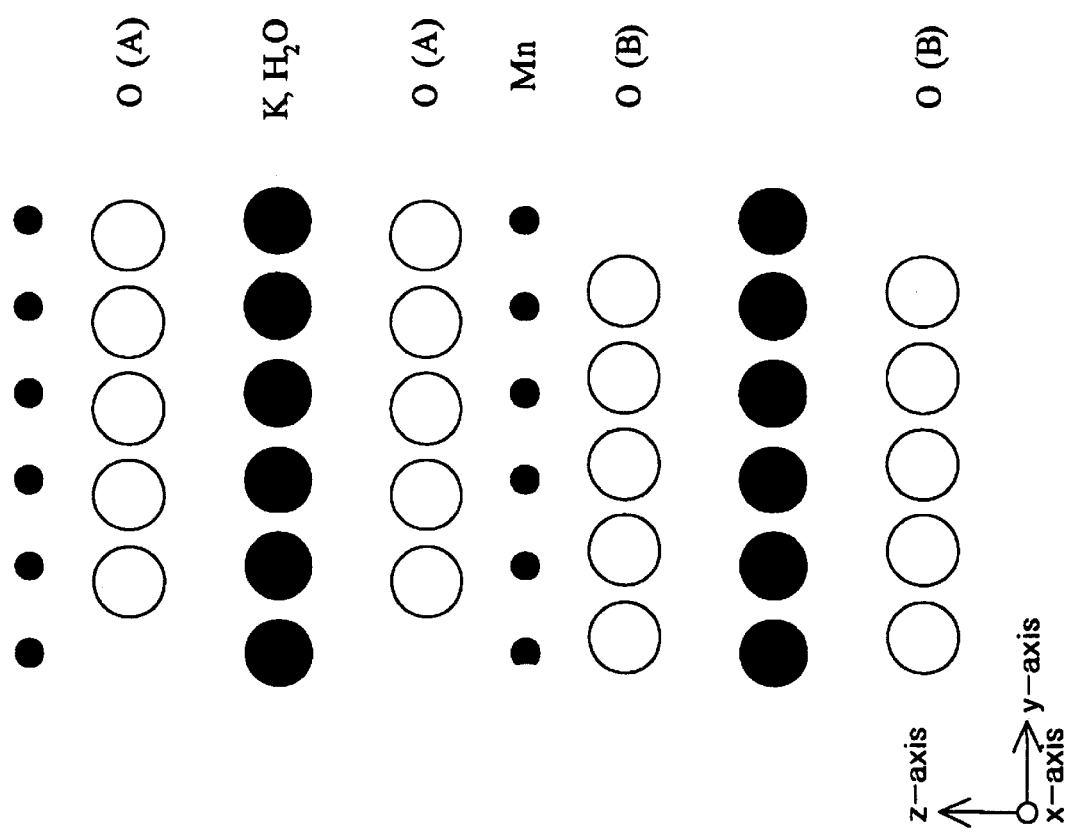
FIG. 2B shows a schematic view of crystal structures of the $MnO_2$ materials produced according to the embodiments of the present invention.
Figure 3:
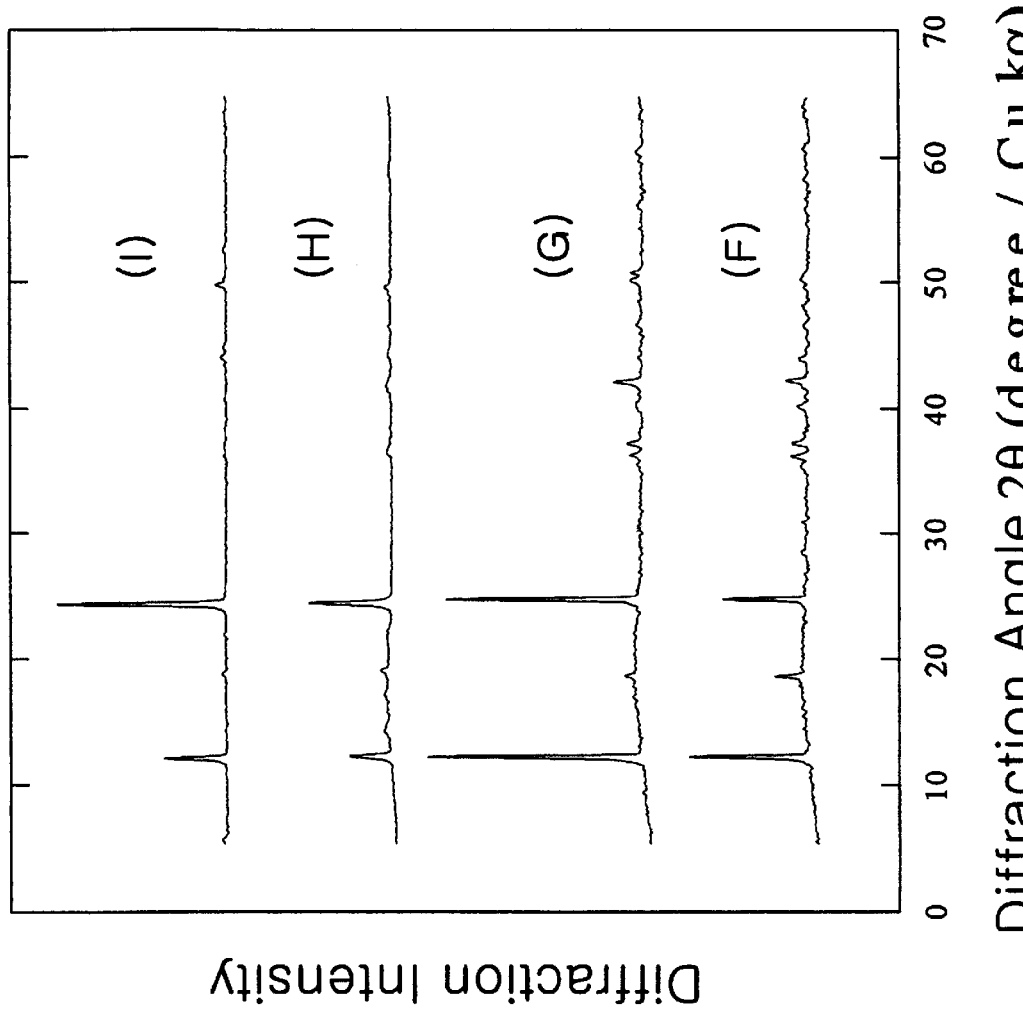
Figure 4:
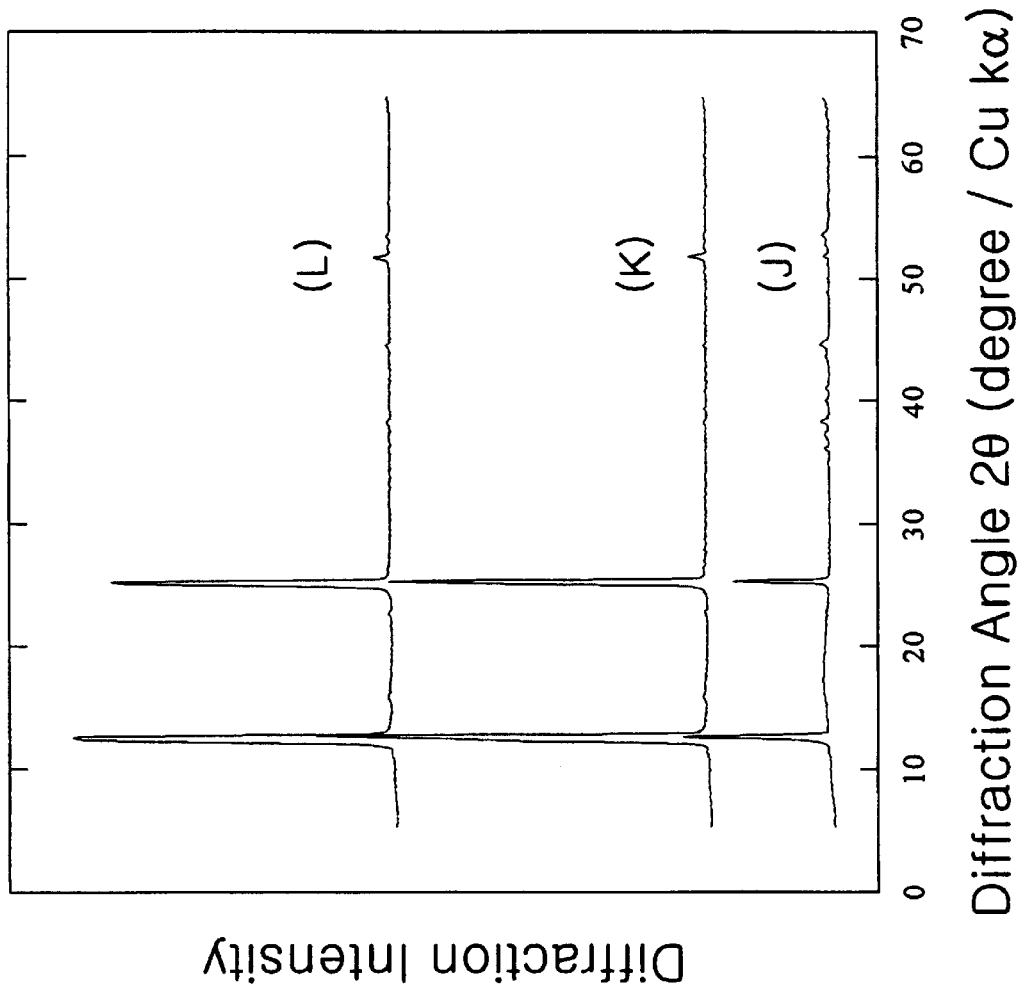
Figure 5:
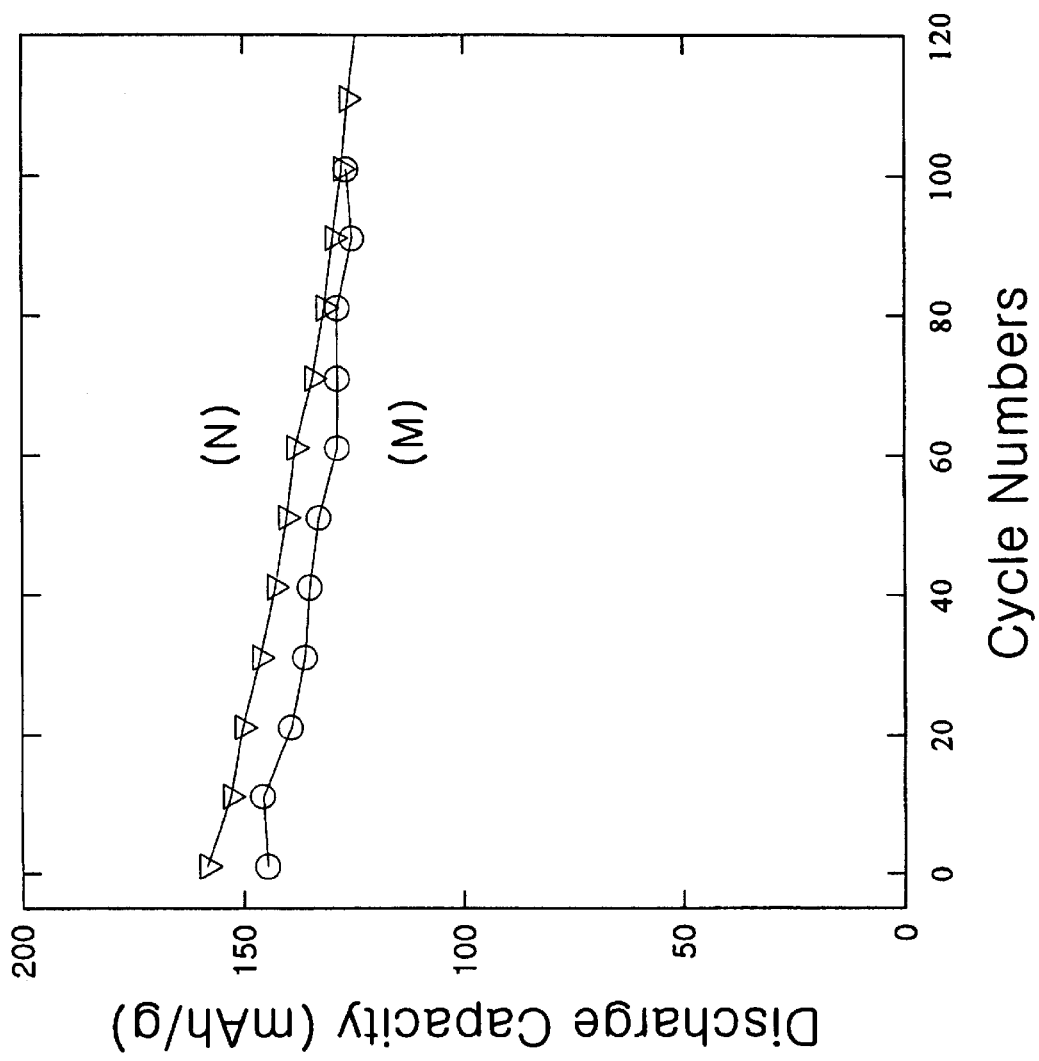
FIG. 5 shows a variation of discharge capacity of layered structure $MnO_2$ materials produced according to the embodiments of the present invention based upon a cycle number of charge and discharge, at a constant current.
Figure 6:
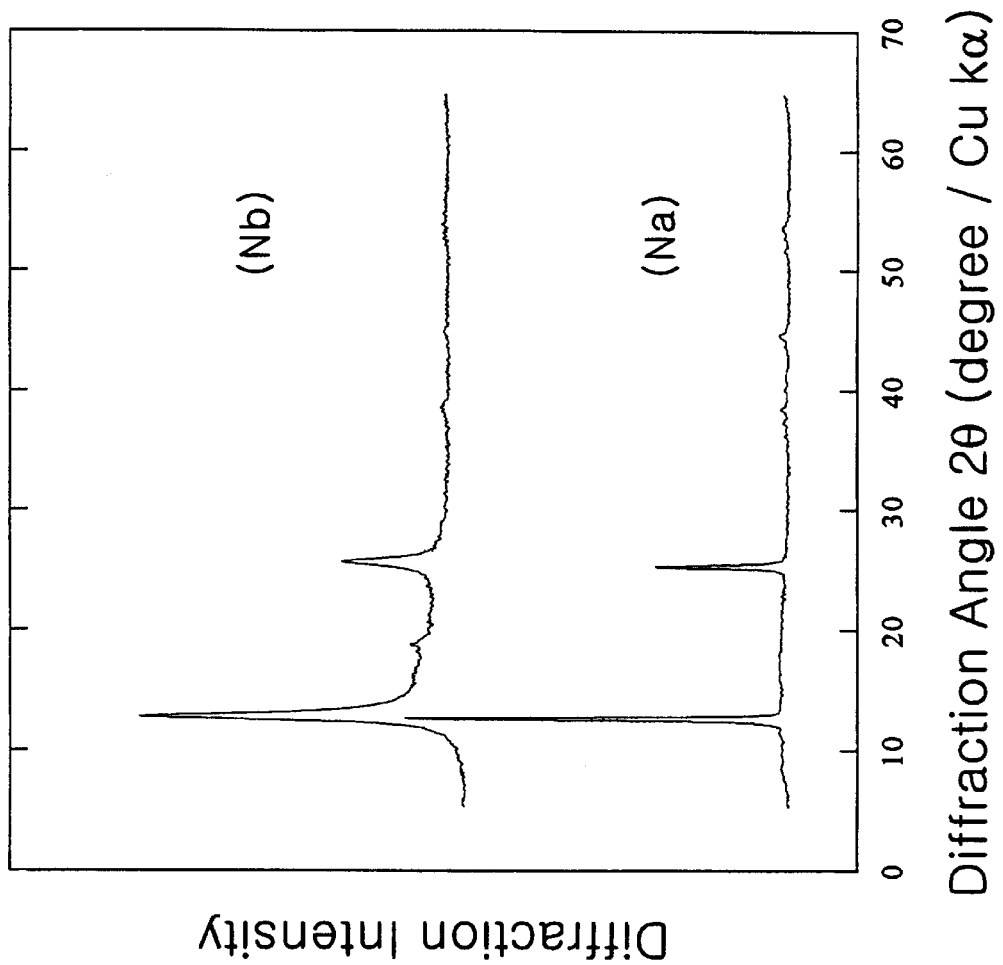
FIG. 6 shows X-ray diffraction patterns of layered structure $MnO_2$ materials produced according to the embodiments of the present invention before and after cycles of charge and discharge, at a constant current.

According to the process of the embodiments of the present invention, it is possible to produce a layered structure $MnO_2$ having crystalline properties as shown in FIGS. 1, 3 and 4, using only a very simple process of heat treatment. In addition, the layered structure $MnO_2$ produced by the present invention has an excellent charge and discharge reversibility as shown in FIG. 5 and thus it is suitable for a cathode material in rechargeable cells. In particular, as shown in FIG. 6, the layered structure $MnO_2$ maintains its initial crystal structure without being transformed to different phases such as a spinel phase after 100 cycles of charging and discharging. Such properties cannot be found in previously known materials and thus provide a distinguishable and substantial advantage of the present invention. The reason that the transformation to a spinel phase does not occur during charge and discharge cycling is that the layered structure $MnO_2$ produced according to the present invention has the oxide arrangement corresponding to pseudo-hexagonal close packing ( . . . AABB . . . ), which is confirmed in FIG. 2B, whereas a spinel type $MnO_2$ has the oxide arrangement corresponding to cubic close packing ( . . . ABCABC . . . ).

What is claimed is:

1. A process for producing a layered structure manganese dioxide $MnO_2$, comprising the step of heating a dry powdery mixture of an alkali metal compound and a manganese compound at a temperature in the range of from 500 to 1500° C. to produce the layered structure manganese dioxide $MnO_2$, wherein the alkali metal is one selected from the group consisting of potassium, rubidium and cesium;

the molar ratio of alkali metal element to Mn is in the range of from 0.25:1 to 0.75:1; and the oxide arrangement of the layered structure manganese dioxide is a pseudo-hexagonal oxide packing pattern.

2. A process according to claim 1, wherein the alkali metal compound is a nitrate, a carbonate or a hydroxide of potassium, rubidium or cesium, and the manganese compound is MnO, $Mn_3O_4$, $Mn_2O_3$, a nitrate of manganese or a carbonate of manganese.

3. A process according to claim 1, wherein prior to heating, adding an additional material to the mixture, the additional material being selected from the group consisting of a lithium compound, a bismuth compound, a lead compound and a mixture thereof, and the additional material is present in an amount such that:

the molar ratio of Li:Mn is 0.5:1 or less if the additional material includes the lithium compound, the molar ratio of Bi:Mn is 0.1:1 or less if the additional material includes the bismuth compound, and the molar ratio of Pb:Mn is 0.1:1 or less if the additional material includes the lead compound.

4. A process according to claim 3, wherein the lithium compound is LiOH, LiNO$_3$ or Li$_2$CO$_3$, the bismuth compound is Bi$_2$O$_3$ or Bi(NO$_3$)$_3$, and the lead compound is PbO or Pb(NO$_3$)$_2$.

5. A process according to claim 3, wherein the mixture is heated to a temperature of from 700 to 1100° C.

6. A process according to claim 3, wherein the molar ratio of alai metal element: Mn is in the range of from 0.3:1 to 0.6:1.

7. A process according to claim 3, wherein
the layered structure manganese dioxide has a hexagonal P6$_3$/mmc space group or an orthorhombic Cmcm space group.

8. A process according to claim 1, wherein the mixture is heated to a temperature of from 700 to 1100° C.

9. A process according to claim 1, wherein the molar ratio of alkali metal element: Mn is in the range of from 0.3:1 to 0.6:1.

10. A process according to claim 1, wherein
the layered structure manganese dioxide has a hexagonal P6$_3$/mmc space group or an orthorhombic Cmcm space group.

11. A lithium rechargeable battery, comprising:
a cathode active material produced by a process comprising the steps of:
heating a dry powdery mixture of a compound of an alkali metal selected from the group of sodium, potassium, rubidium and cesium and a manganese compound at a temperature of from 500 to 1500° C.; and
washing and drying the mixture to produce the layered structure manganese dioxide wherein an oxide arrangement of the layered structure manganese dioxide is a pseudo-hexagonal oxide packing pattern.

12. A lithium rechargeable battery according to claim 11, wherein in the process of producing the cathode:
prior to heating, adding an additional material to the mixture, the additional material being selected front the group consisting of a lithium compound, a bismuth compound, a lead compound and a mixture thereof, and
the additional material is present in an amount such that:
the molar ratio of Li:Mn is 0.5:1 or less if the additional material includes the lithium compound,
the molar ratio of Bi:Mn is 0.1:1 or less if the additional material includes the bismuth compound, and
the molar ratio of Pb:Mn is 0.1:1 or less if the additional material includes the lead compound.

13. A layered structure manganese dioxide having:
an oxide arrangement with a pseudo-hexagonal close packing pattern ( . . . AABB . . . ); and
a hexagonal P6$_3$/mmc space group or an orthorhombic Cmcm space group.

* * * * *